April 21, 1936.    J. M. LARSON    2,037,911
THERMOSTATIC CONTROLLING APPARATUS
Filed Feb. 14, 1935
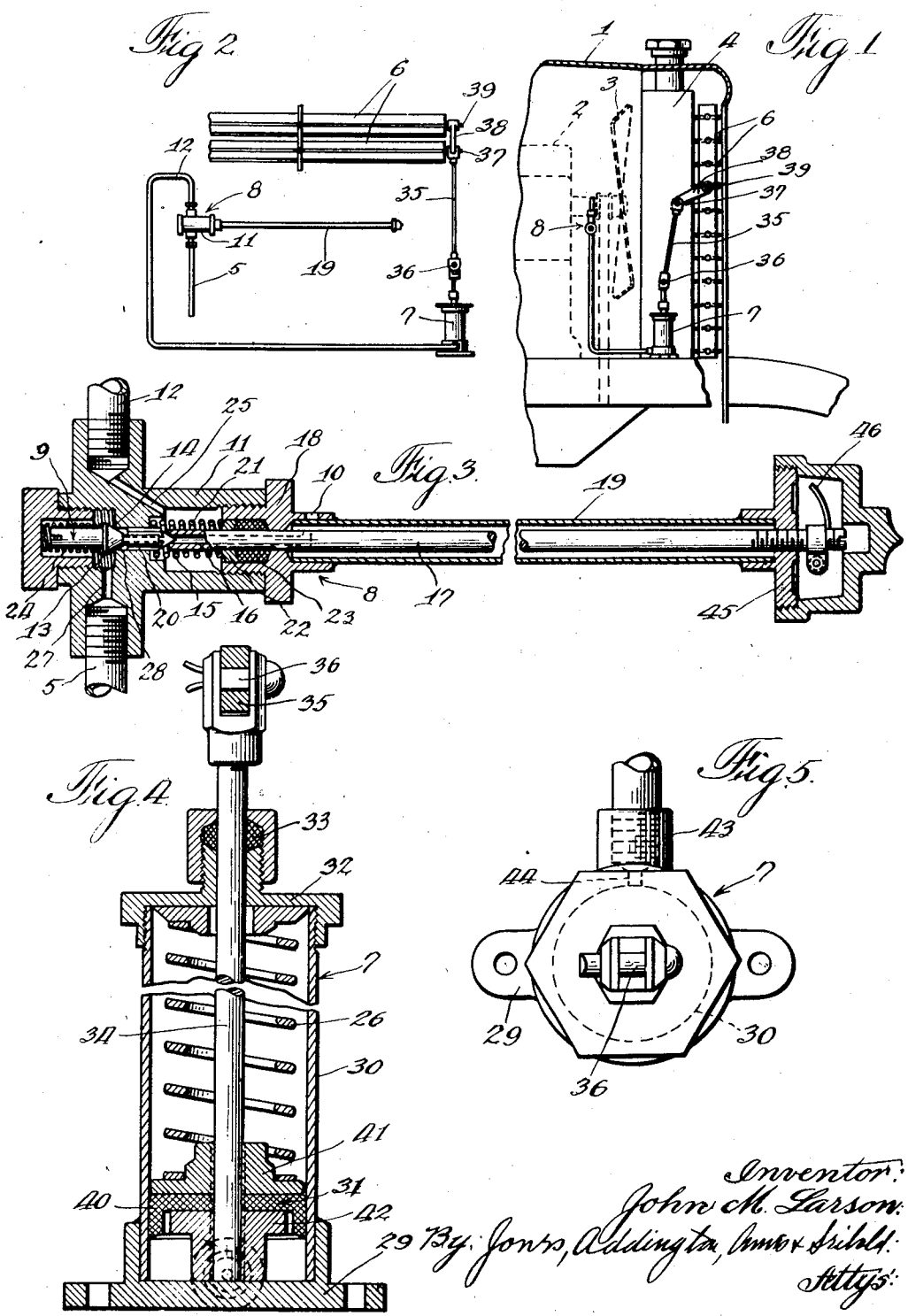

Patented Apr. 21, 1936

2,037,911

UNITED STATES PATENT OFFICE 2,037,911

THERMOSTATIC CONTROLLING APPARATUS

John M. Larson, Chicago, Ill., assignor to National Regulator Co., Chicago, Ill., a corporation of Illinois Application February 14, 1935, Serial No. 6,467

1 Claim. (Cl. 236—35)

My invention relates to thermostatic means for controlling the temperature of air under the hood of motor vehicles, or the like.

One of the objects of my invention is to provide thermostatic means for controlling the temperature in the cooling system of a motor vehicle, making use of the compressed air supply or vacuum which is used for applying brakes and the like.

A further object is to provide a construction involving the use of highly compressed air or vacuum in which there will be no objectionable restrictions in the air supply passages which might become clogged up by oil, condensation, dust, etc.

A further object is to provide a construction making use of the compressed air supply which will enable the compressed air actuator to be operated quickly and positively by connection either with the non-atmospheric air supply or with the exhaust to atmosphere.

A further object of my invention is to provide such a construction in which the thermostat itself is practically all metal.

A further object of my invention is to provide a construction involving the use of the compressed air supply which will enable the temperature to be controlled in a graduated manner.

A further object of my invention is to provide such a construction in which the non-atmospheric air actuator embodies a dust-proof power cylinder.

A further object of my invention is to provide a thermostatic control, making use of the compressed air supply or vacuum which may be made as a unit and mounted on the shutter or other air flow controlling means.

A further object of my invention is to provide a thermostatic control, using the compressed air supply or vacuum in which a defective or leaky valve will not prevent proper operation.

Further objects and advantages of my invention will be apparent from the description and claim.

In the drawing, in which an embodiment of my invention is illustrated—

Figure 1 is a sectional side elevational view showing an installation in a motor vehicle.

Fig. 2 is a front elevational view of parts shown in Fig. 1;

Fig. 3 is an axial sectional view of the thermostatic apparatus;

Fig. 4 is an axial sectional view of the pneumatic actuator; and

Fig. 5 is a plan view of the actuator shown in Fig. 4.

Referring to the drawing in detail, the construction shown comprises the hood 1, motor 2, fan 3 and radiator 4 of a motor vehicle, which may be a bus or the like, having a compressed air or vacuum supply 5 for operating the brakes, etc., in combination with adjustable means such as a shutter 6 for controlling the air drawn through the radiator by the fan, a compressed air actuator 7, for controlling the position of the shutter, and thermostatic means 8 controlled by the temperature of the air which passes through the radiator for controlling the actuator 7.

The thermostatic means includes valve means 9 which, in one position, opens the connection between the compressed air supply 5 and the actuator 7 and completely cuts off the atmospheric port 10, in another position opens the atmospheric connection 10 and completely closes the compressed air connection 5, and in a third (neutral) position completely cuts off both the compressed air supply connection and the atmospheric connection, whereby the actuator will be held stationary in this third position and whereby the actuator and hence the shutter may be positively controlled in a graduated manner and held in any position in which the temperature becomes such that the thermostatic valve means are in neutral position.

The thermostat itself comprises a valve casing 11 or housing having a connection for the compressed air supply 5 and a connection 12 permitting the passage of air to and from the actuator 7, a valve member having a valve portion 13 cooperating with a valve seat 14 for controlling the connection between the compressed air supply 5 and the actuator 7 and having also a conical valve portion 15 cooperating with a seat at the end of the tubular passage 16 in the thermostatically controlled stem 17, a packing gland 18 in which the tubular stem 17 may slide, having an opening to atmosphere at 10 to enable the exhaust of air flowing through the tubular stem, and a tubular heat expansible element 19 on which the outer end of the stem 17 is mounted. The portion of the valve member which operates in the passage in the valve casing is fluted at 20, so that this fluted portion can act as a valve guiding and positioning member and still not interfere with the flow of air through the passage.

A spring 21 is provided acting on a packing ring 22 which compresses the packing material 23 to insure a leakproof construction at this point. The tubular thermostatic element 19 is mounted on and carried by the packing gland 18.

Briefly, the operation of the thermostat is as follows:

If the temperature becomes higher than that which the thermostat is designed to maintain, the tubular thermostatic element 19 elongates, permitting the spring 24 to close the valve 13, thus cutting off the compressed air supply 5 and preventing further actuation of the pneumatic actuator 7 under the action of compressed air.

This prevents any further closing movement of the shutter 6. If the temperature still remains excessive, the thermostatic element 19 will elongate still further, causing the end of the tubular portion of the stem 17 to move away from the conical valve portion 15 and enabling the compressed air in the pneumatic actuator 7 to escape through the passage 25, the tubular passage 16 in the stem 17, and out through the atmospheric port 10 in the packing gland 18. The resulting movement of the pneumatic actuator under the action of the spring 26 moves the shutter 6 in an opening direction, thus further reducing the temperature in the radiator 4.

If the temperature becomes lower than that which the thermostat is set to maintain, the tubular thermostatic element 19 contracts, bringing the end of the tubular stem 17 against the conical valve portion 15, thus cutting off the atmospheric connection to the pneumatic actuator 7 and preventing any further movement of the actuator 7 under the action of the spring 26. If the temperature still remains lower than that which it is desired to maintain, the thermostatic element 19 will contract still further, forcing the conical valve portion 13 away from its seat 14 and permitting the supply of compressed air to the pneumatic actuator through the passages 27, 28, and 25, thus causing the pneumatic actuator 7 to move the shutter 6 in a closing direction which will tend to lessen the cooling action of the radiator and allow the temperature to rise.

The pneumatic actuator shown (Figs. 4 and 5) comprises a mounting base 29, a cylinder 30 fitting into this mounting base, a piston 31 operating in the cylinder 30, a spring 26 for opposing the action of the compressed air on the piston, and a head 32 for the cylinder having a packing gland 33 through which the piston rod 34 operates. The piston rod 34 may be connected with the shutter or damper construction 6 in any suitable manner, as by means of the link 35 (Figs. 1 and 2) pivotally connected at 36 with the piston rod 34 and pivotally connected at 37 with a crank 38 on a damper operating shaft 39. The spring 26 for the piston is made flat so that the spring may be compressed into a small space to enable a relatively great movement of the piston. The piston itself comprises a cup-shaped flexible washer or packing member 40 held in place between two clamping members 41 and 42 threaded on the piston rod. The cylinder below the piston is connected with the compressed air supply 12 by a nipple 43 having an opening therethrough in communication with a registering opening 44 in the cylinder wall.

The stem 17 is adjustably mounted by providing a screw-threaded connection with a head 45 which is secured on the end of the tubular heat expansible element 19. By threading the stem 17 in or out the thermostat may be adjusted to maintain any desired temperature.

The thermostat itself is preferably all metal. The stem may be of a material known as "Invar," having a very low coefficient of expansion and the tubular thermostatic element may be of some suitable metal, as brass.

It will be seen that the construction described provides means for controlling the temperature in motor vehicles which enables the use of the high pressure compressed air or vacuum supply used for operating brakes, or the like, and that there are no small restricted passages which might be apt to get clogged up with oil, condensation, dust, etc. It will also be seen that the construction enables a graduated action of the shutter; that is, is an action in which the pneumatic actuator may be held in a stable manner in any intermediate position to which it may be adjusted by the thermostatic controller. It will also be seen that the construction is such as not to be greatly affected by the vibrations to which motor vehicles are subjected and that it may be mounted as a unit on the shutter or damper construction. It will also be seen that a defective or leaky valve will not prevent the operation of the device, since if either of the valve portions fails to seat properly, the leakage occasioned thereby will only slightly delay the action of the pneumatic actuator 9. Thus, if the valve portion 13 seats imperfectly, air will leak past to the actuator 7, holding the shutter against opening movement until the temperature rises slightly to open the exhaust passage at 15 sufficiently to counteract or overcome the effect of the leakage at 13. On the other hand, if the valve portion 15 seats imperfectly, air will leak past from the actuator 7 to the exhaust port 10, holding the shutter against closing until the temperature falls slightly to open the air supply at 13 sufficiently to counteract or overcome the effect of the leakage at 15.

It will be noted that should the compressed air supply fail, the damper will be moved to open position by the spring 26, thus preventing overheating. The stem 17 may be provided with an index 46 for cooperation with a scale or dial on the head 45, for use in adjusting for temperature.

The packing 33 is not air-tight nor is the fit of the piston rod 34 in the head 33 air-tight, as the movement of the piston 31 necessitates a flow of air past head 32 and the packing gland. The packing gland does, however, serve to make the cylinder dust-proof.

The use of compressed air in the power cylinder enables a powerful action to be exerted on the damper which will prevent it from sticking, due to freezing or to friction occasioned by the anti-rattle construction used in such shutters.

Further modifications will be apparent to those skilled in the art and it is desired, therefore, that the invention be limited only by the prior art and the scope of the appended claim.

Having thus described my invention, what I claim and desire to secure by Letters Patent is:

The combination with the motor, radiator, compressed air supply and fan for a motor vehicle, of adjustable means for controlling the amount of air drawn through the radiator by the fan, means biasing said air-controlling means toward open position, a compressed air actuator connected with the compressed air supply acting against the biasing means to move the air-controlling means toward closed position whereby if the compressed air supply fails the biasing means will move the air-controlling means to open position, valve means which in one position open the connection between the compressed air supply and the actuator and completely close the atmospheric connection, in another position open the atmospheric connection and completely close the compressed air connection, and in a third position completely close both the compressed air supply connection and the atmospheric connection, whereby the adjustable air-controlling means may be controlled in a graduated manner, and thermostatic means for controlling said valve means.

JOHN M. LARSON.